United States Patent [19]
Horiuchi et al.

[11] Patent Number: 5,508,351
[45] Date of Patent: Apr. 16, 1996

[54] GOLF BALL

[75] Inventors: Kuniyasu Horiuchi, Kobe; Akihiko Hamada, Kakogawa, both of Japan

[73] Assignee: Sumitomo Rubber Industries, Ltd., Hyogo, Japan

[21] Appl. No.: 102,728

[22] Filed: Aug. 6, 1993

[30] Foreign Application Priority Data

Aug. 6, 1992 [JP] Japan ................................ 4-210139

[51] Int. Cl.$^6$ ............................ C08L 33/02; A63B 37/12
[52] U.S. Cl. ................... 525/196; 273/235 R; 525/919; 525/221
[58] Field of Search ............................................. 525/196

[56] References Cited

U.S. PATENT DOCUMENTS

| | | | |
|---|---|---|---|
| 3,789,035 | 1/1974 | Iwami et al. | 525/228 |
| 5,218,057 | 6/1993 | Kurkov et al. | 525/369 |
| 5,321,089 | 6/1994 | Cadorniga et al. | 525/196 |
| 5,328,959 | 7/1994 | Sullivan | 525/196 |

FOREIGN PATENT DOCUMENTS

| | | |
|---|---|---|
| 2157382 | 6/1973 | France . |
| 2625909 | 1/1989 | France . |
| 2247682 | 3/1992 | United Kingdom . |

*Primary Examiner*—Ana L. Carrillo
*Attorney, Agent, or Firm*—Birch, Stewart, Kolasch & Birch

[57] ABSTRACT

Disclosed is a golf ball which comprises a core and a cover covering said core, characterized by that said cover comprises a resin component of (a) 10 to 80 wt % of a saponified polymer obtained by saponifying at least a portion of the ester groups of a copolymer of an olefine having 2 to 8 carbon atoms and an unsaturated acrylate having 3 to 8 carbon atoms with an alkali metal selected from the group consisting of Li, Na, K and mixture thereof, and (b) the remaining amount of an ionomer resin.

3 Claims, No Drawings

GOLF BALL

FIELD OF THE INVENTION

Present invention relates to a golf ball, particularly to an ionomer covered golf ball.

BACKGROUND OF THE INVENTION

As a cover material of golf balls, ionomer resin has been widely used (Japanese Kokai Publication 49727/1974).

In particular, for two-piece golf balls which contain solid cores, almost all balls use the ionomer resin as cover material. It is because the ionomer resin has excellent durability, anti-cutting property, preferred rebound property and easy processing property and it is cheaper than other cover materials usable for golf balls.

However, the ionomer resin is inferior to a Balata cover (a trans-polyisoprene cover) which is used for the cover material of thread-wound golf balls, in regard to hit feeling and controllability (easiness in giving spin to the ball), because of high hardness and high stiffness. Many trials have been made to improve the hit feeling and controllability of the golf ball by making the ionomer resin flexible.

Among them, Japanese Kokai Publication 308577/1989 discloses a flexible ionomer being a sodium salt or zinc salt of a terpolymer which is prepared from an olefine having 2 to 8 carbon atoms, an unsaturated monocarboxylic acid having 3 to 8 carbon atoms and an acrylate monomers having 2 to 22 carbon atoms. The flexible ionomer resin do not have sufficient properties for golf balls.

SUMMARY OF THE INVENTION

The present invention is to provide an improvement of ionomer resin, which provides with golf ball having good hit feeling, excellent controllability and flying properties. The golf ball of the present invention comprises a core and a cover covering the core, wherein the cover comprises a resin component of (a) 10 to 80 wt % of a saponified polymer obtained by saponifying at least a portion of the ester groups of a copolymer of an olefine having 2 to 8 carbon atoms and an unsaturated acrylate having ] to 8 carbon atoms with an alkali metal selected from the group consisting of Li, Na, K and mixture thereof, and (b) the remaining amount of an ionomer resin.

According to the present invention, by mixing the ionomer resin with the copolymer with a specified degree of saponification, the ionomer is made flexible and thereby the feeling of hitting and controllability of the ball are improved and yet severe deterioration of flying performance and anti-cutting property can be avoided.

DETAILED DESCRIPTION OF THE INVENTION

In the present invention, the ionomer resin used for the cover material may be a resin which is obtained by neutralizing a portion of the carboxyl groups of a copolymer of 10 to 20 wt % of an $\alpha,\beta$-unsaturated carboxylic acid having 3 to 8 carbon atoms and 80 to 90 wt % of an $\alpha$-olefine, with a metal ion (ion of Na, Li, Zn, Mg, etc.). The ionomer resin is generally commercially available and there are many types, typically under the tradename of Surlyn from E.I. DuPont de Nemours Co.

In the present invention, the ionomer resin is mixed with the copolymer of an olefine having 2 to 8 carbon atoms and an unsaturated acrylate having 3 to 8 carbon atoms, of which a portion of the ester groups is saponified with an alkali metal selected from the group consisting of Li, Na, K and mixture thereof.

The olefines include ethylene, propylene, 1-butene, isobutylene, 1-pentene, 1-octene, etc. and ethylene or propylene is preferred.

The acrylates include methyl, ethyl, propyl, n-butyl or isobutyl ester of acrylic acid, methacrylic acid, maleic acid, or fumaric acid. Preferred are an acrylate and a methacrylate.

Saponification is conducted in the normal way, for instance, by adding caustic alkali to the copolymer and heating it.

An amount of mixing of the saponified copolymer is 10 to 80 wt %, preferably 20 to 60 wt %, based on the total weight of the resin made mainly of ionomer resin. If it is less than 10%, the resin is not sufficiently flexible and the feeling of hitting ball and controllability of ball are not improved. If it is more than 80%, anti-cutting property is inferior and satisfactory ball is not obtained.

An amount of the unsaturated acrylate in the copolymer of the olefine and unsaturated acrylate is 15 to 40 wt %. If it is less than 15 wt %, the feeling of hitting ball and controllability of ball are not improved while if it is over 40 wt %, anti-cutting property is inferior.

A saponification amount of the ester groups may be 10 to 40 wt % of the total of ester groups. When it is less than 10 wt %, anti-cutting property is inferior and if it is over 40 wt %, melt viscosity is too high and consequently MI (melt index) is too small to conduct mixing.

A stiffness of said copolymer is preferred to be less than 1,000 kgf/cm$^2$ more preferably 500 to 30 If it is large than 1,000 Kgf/cm$^2$ sufficient improvement of hit feeling and controllability of ball is not realized.

The cover of the present invention mainly comprises a resin component of (a) 10 to 80 wt % of the above mentioned saponified copolymer and (b) the remaining amount of the ionomer resin. The cover may further comprises various additives, for instance, pigment, dispersant, antioxidant, UV absorbent, optical stabilizer, etc. if necessary.

The cover of the present invention can cover cores for a golf ball. The cores include not only solid cores for solid golf balls, but also thread-wound cores for thread-wound golf balls. The solid golf balls may include two or more-piece solid golf balls, for example two-piece golf bails, three piece golf ball and the like.

For example, the core of two piece golf-ball may be obtained by press-vulcanizing a rubber composition obtained by mixing 100 wt parts of polybutadiene with 10 to 60 wt parts of a co-crosslinking agent, 10 to 30 wt parts of a filler (such as zinc oxide and barium sulfate), 0.5 to 5.0 wt parts of a peroxide (such as dicumyl peroxide) and 0.1 1.0 wt part of an antioxidant. The co-crosslinking agent includes an $\alpha,\beta$-monoethylenic unsaturated carboxylic acid (e.g. acrylic acid and methacrylic acid), a metal salt thereof, and a functional monomer (e.g. trimethylolpropane trimethacrylate). Press-vulcanization may be conducted by compression heating at 140° to 170° C. for 19 to 40 minutes to form into spherical article.

The thread-wound core is composed of a center and the rubber thread winding around the center. The center may be either liquid base or rubber base. The rubber base center may be the one obtained by vulcanizing the rubber composition same as the solid core.

The rubber thread may be the one having been conventionally used, for instance, one obtained by vulcanizing a rubber composition composed of natural rubber or a combination of natural rubber and synthetic polyisoprene, an antioxidant, a vulcanization accelerator, sulfur, etc. However the solid core or thread-wound core is simply an example and the invention is not limited to these examples.

The method to cover the core with the cover is not limited to a specific method but it may be the normal method. For instance, the cover composition of the present invention is formed into semispherical shape beforehand, covering the core with two of such half-shell and forming it under pressure at 130° to 170° C. for 1 to 5 min. or by covering the core by direct injection-forming of the composition for the cover.

Thickness of the cover is normally about 1.0 to 3.0 mm. At the forming of the cover, dimples are formed at the surface of the ball upon necessity and finishing by paint or stamping are conducted upon necessity.

EXAMPLES

The present invention is described in further detail in reference to the examples and comparative examples.

Examples 1 to 4 and Comparative Examples 1 to 3

Thirty wt parts of zinc acrylate (manufactured by Nippon Shokubai Kagaku Kogyo K.K.), 20 wt parts of zinc oxide (manufactured by Toho Aen Co.) and 1 wt part of dicumyl peroxide (manufactured by Nippon Oil & Fat Co.) were added to 100 wt parts of cis-1,4-butadiene (JSR BR01® of Japan Synthetic Rubber Co.) and after kneading, it was formed under pressure at 150° C. for 30 minutes in a mold for core to obtain a solid core with diameter of 38.5 mm.

Separately, an ionomer resin composition as shown in Table 1 was blended, of which 100 wt parts was mixed with 2 wt parts of titanium oxide ($TiO_2$), and then extruded in an extruder to obtain a cover composition. The amount of composition of ionomer resin shown in Table 1 is by weight parts and it is so arranged that the entire amount makes 100 wt parts. Therefore the numbers indicating the compounding amount simultaneously indicate weight percent in the total.

Thus obtained cover composition was covered directly on the solid core by injection molding to obtain a two-piece golf-ball. Thus obtained ball was coated by paint to prepare the golf-ball with diameter of 42.8 mm.

Weight, compression, initial velocity, flight distance (carry) of the golf ball and stiffness of the cover were measured. The results are shown in Table 1. The methods of measurement of these characteristics are as follows.

(1) Ball compression

According to PGA method (2) Initial velocity (according to R & A measuring method):

A ball was hit by a No. 1 Wood Club at the head speed of 45 m/sec using a swing robot manufactured by Through Temper Corp. and an initial velocity of the ball was measured. Measuring was made on 10 balls of each kind and the results were shown by their average value.

(3) Flight distance (carry)

A ball was hit by a No. 1 wood club at the head speed of 45 m/sec using a swing robot manufactured by Thorough Temper Corp. and a flight distance (carry) was measured. Measurement was made on 10 balls of each kind and the results were shown by their average value.

(4) Stiffness of the cover:

Measurement was made by a stiffness tester manufactured by Toyo Seiki K.K according to ASTM D-747. The sample for measurement was a flat plate prepared by press-forming. After press-forming, the sample plate had been left standing for two weeks at 23° C. in the humidity of 50% and then measurement was made on such plate.

TABLE 1

|  | Examples | | Comparative Ex. | | |
| --- | --- | --- | --- | --- | --- |
|  | 1 | 2 | 1 | 2 | 3 |
| Hi-milan 1605*[1] | 20 | 5 | 50 | 5 | 20 |
| Hi-milan 1706*[2] | 15 | 5 | 50 | 5 | 15 |
| Hi-milan 1557*[3] | 30 | 30 | — | 30 | 30 |
| SA420*[4] | 35 | 60 | — | — | — |
| Surlyn AD8269*[5] | — | — | — | 60 | 35 |
| Weight of ball (g) | 45.2 | 45.2 | 45.3 | 45.2 | 45.3 |
| Compression of ball (PGA) | 90 | 86 | 99 | 87 | 92 |
| Initial velocity of ball (feet/sec) | 252.0 | 251.5 | 252.3 | 249.5 | 250.5 |
| Flight distance (carry; yard) | 226 | 225 | 227 | 220 | 221 |
| Hit feeling of ball*[6] | Good | Good | Bad | Good | Fairly good |
| Controllability*[7] | Good | Good | Bad | Good | Fairly good |

*[1]: Tradename. Sodium ion neutralization type. Manufactured by Mitsui Polychemical Co.
MI = 2.8
Stiffness = ca. 3,100 kgf/cm$^2$
*[2]: Tradename. Zinc ion neutralization type. Manufactured by Mitsui Polychemical Co.
MI = 0.7
Stiffness = Ca. 2,600 kgf/cm$^2$
*[3]: Tradename. Zinc ion neutralization type. Manufactured by Mitsui Dupont Polychemical Co.
MI = 5.0
Stiffness = ca. 2,500 kgf/cm$^2$
*[4]: Tradename. Ethylene-ethylacrylate copolymer resin saponified by sodium. Ethylacrylate = 25%
Amount of saponification = ca. 20%
MI = 0.2
Stiffness = ca. 200 kgf/cm$^2$
*[5]: Tradename. Sodium ion neutralization type ethylene-methacrylic acid-acrylic ester terpolymer
MI = 0.8
Stiffness = ca. 300 kgg/cm$^2$
*[6]: Hit feeling of ball. The ball with smaller impact resistance, soft and light feeling is better.
*[7]: Controllability. The ball which is easy to spin and stops easily on the ground when hit by iron club is better.
Hit feeling of ball and controllability were evaluated by actual hitting test made by 10 top professional golfers.

As it is evident from Table 1, the golf balls of Example 1 and 2 indicate the carry flight distance of 225 to 226 yard which was roughly equal to that of the golf ball of Comparative Example 1, while the golf balls of Comparative Examples 2 and 3 were inferior as for the carry by 5 to 7 yard when compared to the balls of Comparative Example 1 and Examples 1 and 2.

Hit feeling of ball, controllability and flight distance of golf balls of Examples 1 and 2 and comparative examples 1 to 2 were evaluated by actual hitting test made by top professional golfers.

As the result, it was found that the golf balls of Examples 1 and 2 have the hit feeling of ball and controllability roughly equal to the thread wound golf balls covered with the transpolyisoprene (Balata) and the flight distance of carry was also at satisfactory level.

Whereas the golf ball of Comparative Example 1 had the rigid feeling of hitting of ball gives and it was difficult to let it spin and controllability was inferior while the golf balls of comparative Examples 2 and 3 indicated good feeling of hitting and controllability but the carry was inferior.

Anti-cutting property of golf balls of Examples 1 and 2 and Comparative Examples 1 to 3 was investigated by fixing a No. 12 pitching wedge to the swing robot manufactured by Thorough Temper Corp. and the ball was hit at the top at the speed of 30 m/sec and the production of cut injury was investigated.

As the result, it was found that cutting injury was not produced for the golf balls of Example 1 and 2 and comparative example 1 but small cut injury was produced for the golf balls of comparative examples 2 and 3.

Anti-cutting property was investigated under the same conditions also with the thread wound golf balls covered with the cover made mainly of transpolyisoprene (Balata) and it was found that large cut injuries which make the ball unusable have been produced.

According to the present invention, a golf ball with excellent feeling of hitting of ball, controllability and flying performance is obtained.

What is claimed is:

1. A golf ball comprising a core and a cover covering said core, wherein said cover comprises a resin component, comprising:

(a) 10 to 80% by weight of a copolymer containing ester groups, wherein 10 to 40% by weight of said ester groups have been saponified with an alkali metal selected from the group consisting of Li, Na, K, and mixtures thereof, based upon the weight of the resin component, wherein said copolymer comprises:

(1) 15 to 40% by weight of units of an unsaturated acrylate carboxylic ester monomer having 3 to 8 carbon atoms, based upon the weight of copolymer; and (2) units of an olefin monomer having 2 to 8 carbon atoms; and (b) 90–20% by weight of an ionomer resin, based upon the weight of the resin component, which is obtained by neutralizing a portion of the carboxyl groups of a copolymer of 10 to 20 % by weight of an $\alpha,\beta$-unsaturated carboxylic acid having 3 to 8 carbon atoms and 80 to 90% by weight of an $\alpha$-olefin, with a metal ion.

2. The golf ball according to claim 1, wherein said olefine is selected from the group consisting of ethylene, propylene, 1-butene, isobutylene, 1-pentene and 1-octene.

3. The golf ball according to claim 1 wherein said carboxylic ester monomer includes methyl, ethyl, propyl, n-butyl or isobutyl ester of acrylic acid, methacrylic acid, maleic acid, or fumaric acid.

* * * * *